(12) United States Patent
Dusad et al.

(10) Patent No.: US 11,481,178 B2
(45) Date of Patent: Oct. 25, 2022

(54) SECURE MULTIPLE APPLICATION SHARING DURING A REMOTE SESSION

(71) Applicant: Avaya Management L.P., Durham, NC (US)

(72) Inventors: Manish Dusad, Galway (IE); Valentine C. Matula, Granville, OH (US)

(73) Assignee: Avaya Management L.P., Durham, NC (US)

( * ) Notice: Subject to any disclaimer, the term of this patent is extended or adjusted under 35 U.S.C. 154(b) by 0 days.

(21) Appl. No.: 17/162,243

(22) Filed: Jan. 29, 2021

(65) Prior Publication Data

US 2022/0244902 A1 Aug. 4, 2022

(51) Int. Cl.
*G06F 3/14* (2006.01)
*G06F 9/50* (2006.01)
*G06F 3/0481* (2022.01)

(52) U.S. Cl.
CPC .......... *G06F 3/1454* (2013.01); *G06F 3/0481* (2013.01); *G06F 9/5077* (2013.01)

(58) Field of Classification Search
CPC .............. H04L 12/1813; H04L 65/403; H04L 12/1822; H04L 12/18; H04N 7/15; H04M 3/567; H04Q 2213/1324; G06F 3/1454
USPC .................. 709/204, 205, 227; 715/751, 753
See application file for complete search history.

(56) References Cited

U.S. PATENT DOCUMENTS

| | | | | |
|---|---|---|---|---|
| 6,601,087 B1* | 7/2003 | Zhu | .......... | G06Q 10/10 709/204 |
| 8,117,554 B1* | 2/2012 | Grechishkin | ....... | G06F 3/04817 715/764 |
| 10,747,418 B2* | 8/2020 | Pieper | ................. | G06F 3/04842 |
| 2002/0165922 A1* | 11/2002 | Wei | .......... | G09G 5/14 709/205 |
| 2009/0292999 A1* | 11/2009 | LaBine | ............... | H04L 12/1827 715/740 |
| 2010/0131868 A1* | 5/2010 | Chawla | ................. | G06F 3/0481 715/759 |
| 2010/0262925 A1* | 10/2010 | Liu | ..................... | H04L 65/1053 715/759 |
| 2020/0225809 A1* | 7/2020 | Jones | ....................... | H04N 7/15 |

* cited by examiner

*Primary Examiner* — Koosha Sharifi-Tafreshi
(74) *Attorney, Agent, or Firm* — Sheridan Ross P.C.

(57) ABSTRACT

Remote collaboration sessions may allow a local user to share their entire desktop or a single application with a remote user. By allowing each of a number of windows, but not all windows, to be selectively provided by the local computer to the remote computer, a more efficient collaboration session may be provided that does not require the local user to terminate sharing, when sharing a first application, then re-initiate sharing for the second application, just to switch between applications. Or, alternatively, alleviates the need to select the entire desktop that may comprise confidential information not to be shared. By allowing each, but not all, applications to be shared remotely and simultaneously, a remote user can be presented with relevant, but not excluded, application windows from the local computer.

20 Claims, 6 Drawing Sheets

SECURE MULTIPLE APPLICATION SHARING DURING A REMOTE SESSION

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for the secure sharing of application displays during a conference and particularly to secure sharing of multiple applications without exposing additional content.

BACKGROUND

Remote connectivity between networked computers is now commonplace. Often, such as during a web collaboration session, a user may wish to share their desktop, which is then presented on a remote node. As a result, a remote user is able to see the entirety of the desktop being shared. Similarly, an application may be executed on a computer and present as a window on the display of the computer. A user may share the application, or more accurately, the visual representation of the application within a window, with the remote user. As a result, the remote user is presented with only the application. Despite the advantages of such systems and methods, problems remain.

SUMMARY

Sharing the display contents of a first computer with a second computer during a remote communication session is a particularly useful way for a remote user to see exactly what is being presented on the display. However, systems and methods of the prior art require sharing of either the entire desktop and all content thereon, or the sharing of one, and only one, application. As a result, a user who does not wish to share their entire desktop, but does want to share the contents of two applications, must share one application, stop sharing, then share the second application. During the process, connections are terminated and re-established, which may be sufficient to interrupt the flow of progress between the local and remote users. For example, an operation performed on one application may need to be verified on a second application, but may quickly prove frustrating if several minutes are required for the local user to terminate sharing and re-establish sharing of the second application, only to have to repeat the process to return to the first application.

As can be appreciated, the time required to serially share multiple applications can become untenable, especially if multiple switching operation are required. This may cause the local user to either revert to sharing their entire desktop—including any confidential content that is present—or abandon the collaboration session entirely.

These and other needs are addressed by the various embodiments and configurations of the present invention. The present invention can provide a number of advantages depending on the particular configuration. These and other advantages will be apparent from the disclosure of the invention(s) contained herein.

In one embodiment, systems and methods are provided to enabling the sharing of two or more applications but without sharing the entire desktop. A local user and system then enable the remote user and system to be presented with each of the shared applications. Additionally or alternatively, one or more of the shared applications may be visual hidden, allowing the local user and/or remote user to toggle between the applications being shared but without requiring the termination and re-establishment of the sharing for the application to be shared.

As a benefit, if either the local or remote system has insufficient screen space (e.g., single display, insufficient resolution, etc.), the applications may be shared simultaneously but presented serially. In another embodiment, if system limitations (e.g., remote computer CPU cycles, local computer CPU cycles, bandwidth, etc.) prevent simultaneous sharing of multiple applications, the applications may be prioritized to allow system resources to allocate the higher priority application.

Priority maybe determined based on visual information conveyed from the local computer to the remote computer, such as an application presenting an animation, versus more visually static information, such as a spreadsheet. Therefore, while the spreadsheet may, or may not, be requiring more CPU cycles, system resources required to present the animation may be given priority to enable improved image presentation on the remote computer. Alternatively, the more visually static application, such as the spreadsheet in the forgoing example, may be given a higher priority, as it may be acceptable to degrade the quality of the animated image as presented to the remote computer, if the spreadsheet's operations are deemed to be higher priority.

In one embodiment, a square grid is provided on the local computer having squares with each shared application. The local user may drag indicia of applications into the grid for their presentation during the collaboration session. For example, the selection of an application's windows could be made and placed on the grid via an input to a touchscreen, touchpad, mouse, shortcut keys, voice control etc. Additionally or alternatively, the local user can provide inputs to move between application windows and can also share independent windows at the same time in a particular configuration (e.g., side by side). As a further embodiment, the remote user may alter the placement of the applications, such as to spread applications across multiple screens.

A system on a chip (SoC) including any one or more of the above embodiments or aspects of the embodiments described herein.

One or more means for performing any one or more of the above embodiments or aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above embodiments or aspects, wherein the data storage comprises a non-transitory storage device comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with a like reference number. When such a reference is made in the singular form, but without identification of the sub-reference identifier, is a reference one of the like numbered elements, but without limitation as to the particular one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
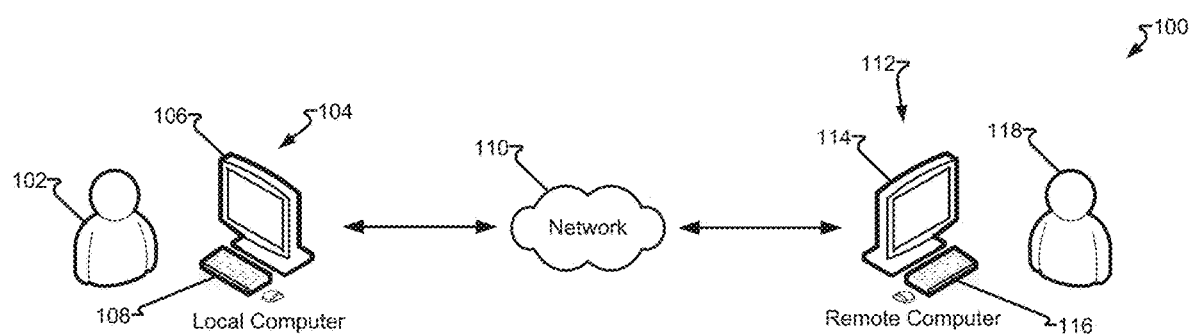
FIG. 1 depicts a first system in accordance with embodiments of the present disclosure.

FIG. 1 depicts system 100 in accordance with embodiments of the present disclosure. In one embodiment, local user 102 wishes to establish a collaboration session with remote user 118. Accordingly, local user 102 utilizing input device 108 on local computer 104, and receiving visual content presented on local display device 106, establishes a connection with remote display device 114 via network 110. In another embodiment, some but not all of the content presented on local display device 106 is also received by remote computer 112 and presented on remote display device 114. As a further option, remote user 118 may utilize remote input device 116 to provide raw or processed inputs (e.g., keystrokes, mouse inputs, touchscreen inputs, touchpad inputs, etc.) to the content presented on remote display device 114 and the signals received on remote computer 112 provided to local computer 104, thereby allowing remote user 118 to remotely operate the applications executing on local computer 104 that are providing the content shared with local user 102 and presented on remote display device 114.

As will be described more completely with respect to the embodiments that follow, local user 102 may provide inputs, such as via local input device 108, local user 102 may wish to share two or more applications, but less than all applications, currently executing by at least one processor of local computer 104. Accordingly, only those applications selected for sharing, that provide an output (e.g., window, dialog, etc.) on local display device 106, are provided to remote computer 112. While a visual output is generally more common, it should be appreciated that other applications may execute on local computer 104 and provide non-visual forms of outputs on local computer 104 or on an associated peripheral device. Accordingly, and in another embodiment, the output by local computer 104 may selective be, or not be, shared with remote computer 112 when the output is visual for presentation on a display (e.g., local display device 106, remote display device 114) and/or other forms of output (e.g., audio, haptic/tactile, peripheral device signals, etc.).

In another embodiment, one of the applications available for sharing is the output of the operating system executing on local computer 104 as visually represented by the desktop application provided by the operating system. Accordingly, if selected, the desktop (exclusive of application windows for applications not shared) is provided to remote computer 112 and, if not shared, the desktop is not provided to remote computer 112.

Figure 2:
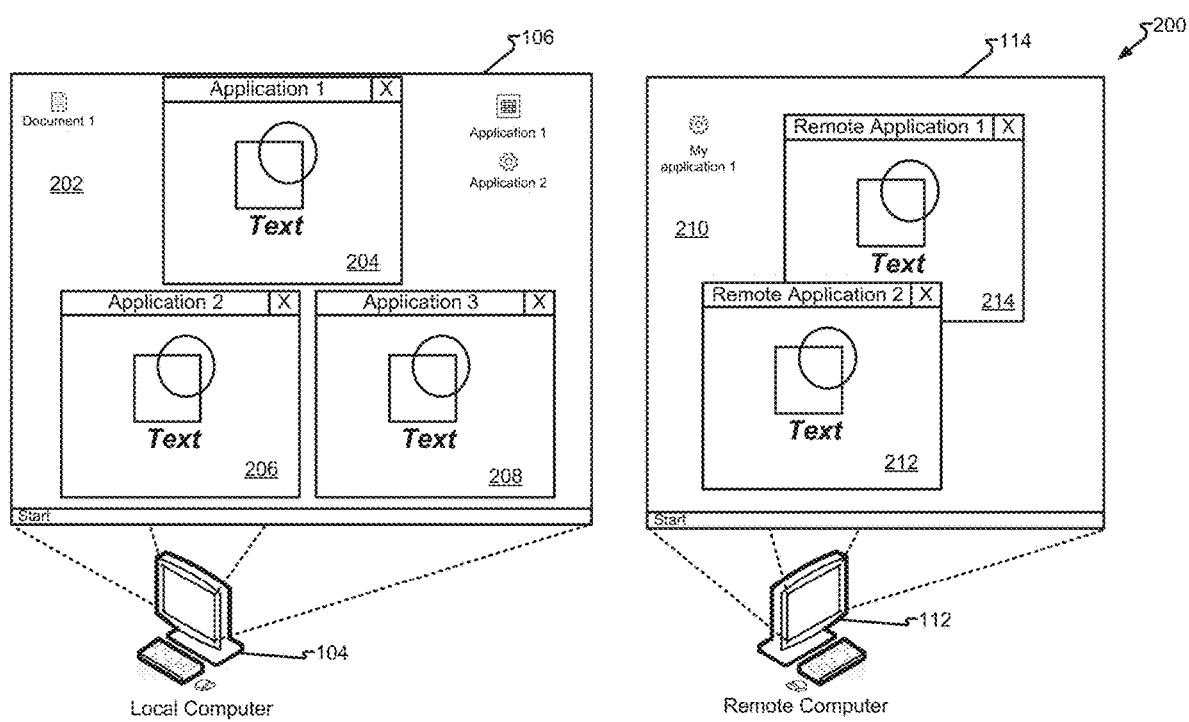
FIG. 2 depicts a second system in accordance with embodiments of the present disclosure.

FIG. 2 depicts system 200 in accordance with embodiments of the present disclosure. In one embodiment, local computer 104 comprises local display device 106 presenting local desktop 202, first local application 204, second local application 206, third local application 208. Local desktop 202 may comprise windows or other graphical displays of applications executing on local computer 104, icons of installed applications, utilities (e.g., clock, system status, etc.), background images, function buttons, indicia of documents, files, etc. and/or other content as presented by the desktop application executed by the operating system of local computer 104. As illustrated, local desktop 202 presents four executing applications, although more or few executing applications may be present, such as when minimized or when not configured to comprise a visual representation. The four executing applications illustrated and providing visual content are local desktop 202 itself, first local application 204, second local application 206, and third local application 208.

In another embodiment, remote computer 112 executes an operating system presenting remote desktop 210. Remote desktop 210, similarly to local desktop 202 may present windows or other display content for currently running applications, function buttons, indicia of documents, files, etc. As illustrated, remote desktop 210 is presenting first remote application 214, comprising the output presented by local computer 104 of first local application 204 and shared with remote computer 112 and second remote application 212, comprising the output presented by local computer 104 of second local application 206. Remote computer 112 and local computer 104 may also each execute a collaboration application (not shown) to manage, at least in part, the connection between local computer 104 and remote computer 112 and the data provided therebetween.

In one embodiment, local computer 104 has been configured to only share the outputs of first local application 204 and second local application 206. As described herein, at least two applications executing on local computer 104 provide a visible output as presented on local display device 106 and are also shared with remote computer 112 for presentation by remote display device 114. In another embodiment, one or more executing applications, such as local desktop 202 and third local application 208 are excluded from sharing with remote computer 112 during the collaboration session while other application outputs are shared.

Figure 3:
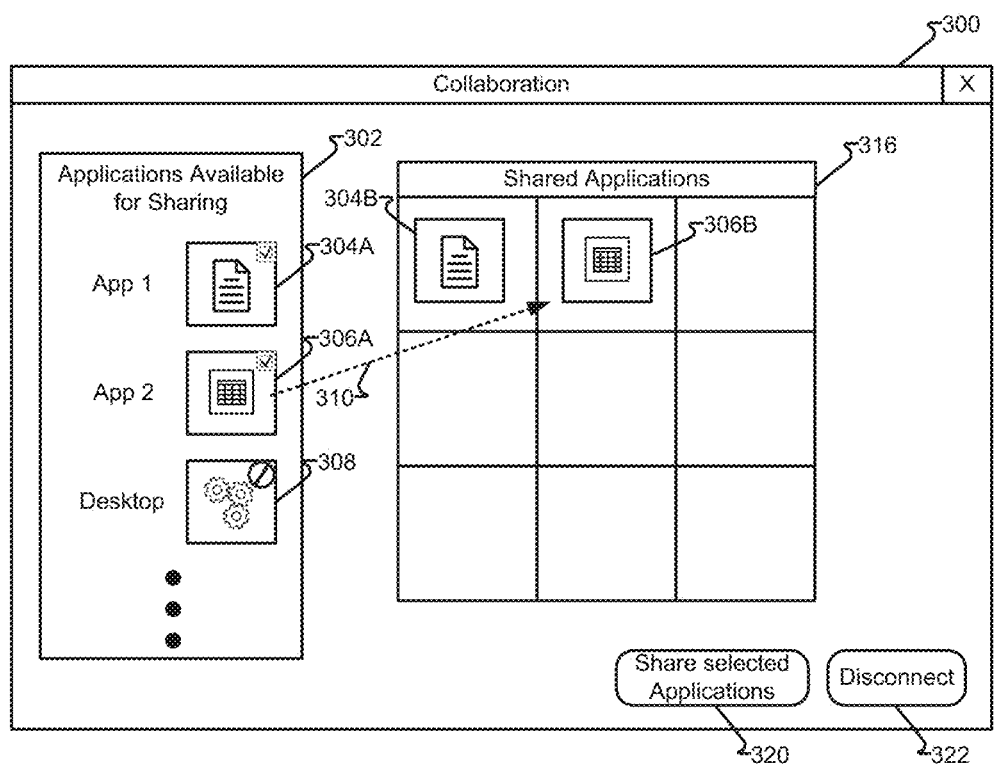
FIG. 3 depicts a collaboration application window in accordance with embodiments of the present disclosure.

FIG. 3 depicts collaboration application window 300 in accordance with embodiments of the present disclosure. In one embodiment, collaboration application window 300 is executed by a collaboration application of a processor of local computer 104. The collaboration application may comprise connectivity management features and/or other features to enable selected portions of the content presented on local display device 106 to be, or not be, shared with remote computer 112 to be presented by remote display device 114. Applications executing on local computer 104, or which may be launched prior to or during a collaboration session, may be represented by text, icon, and/or other indicia, such as within available application listing 302 and include, for example, first local application indicia 304A, second local application indicia 306A, and third local available application indicia 308 indicating that their associated applications may (or may not) be shared during a collaboration session.

In another embodiment, applications' outputs that are shared with remote computer 112 during a collaboration are illustrated as having been moved (or copied) to be within shared application listing 316, such as first local application indicia 304B and second local application indicia 306B. Accordingly, the content produced by a first application that has an associated window associated with first local application indicia 304, will be shared during a current or future, if not yet launched, collaboration session.

As a further options, applications within available application listing 302 may have their indicia modified, such as to indicate whether they are being shared, are not being shared, or cannot be shared (e.g., no user selectable option is present to allow sharing). For example third application indicia 308 may indicate that the desktop is not sharable.

In one embodiment, applications are shared upon dragging indicia from available application listing 302 to shared application listing 316. Sharing is terminated upon dragging indicia from shared application listing 316 to available application listing 302 or, optionally, merely outside of shared application listing 316. In another embodiment, share selected applications button 320 to commit the changes must be selected to commit any changes made to the indicia that are within shared application listing 316 to cause their associated applications to, or not to, being shared. As a further option, collaboration application window 300 may comprise collaboration session management features, such as whether a remote user will be allowed shared applications to be view-only or if whether remote inputs will be accepted or if the whole session is to be terminated, such as via input to disconnect button 322.

While indicia of an application may comprise an icon, text, or similar identifier, the indicia may be the window itself as presented on local display device 106. For example, a portion of local display device 106 may be allocated for shared applications and a window, such as first local application 204, when placed within the allocated area, is then shared with remote computer 112 and not shared if elsewhere. This may be further embodied as a separate display, such as when local display device 106 comprises a plurality of display devices, and wherein one display comprises shared windows and one comprises windows not shared.

In another embodiment, selecting indicia of an application, such as second local application indicia 306A and dragging, illustrated by dashed line 310, to shared application listing 316 then causes the collaboration application to share the output window associated with second local application indicia 306 with remote computer 112.

Figure 4:
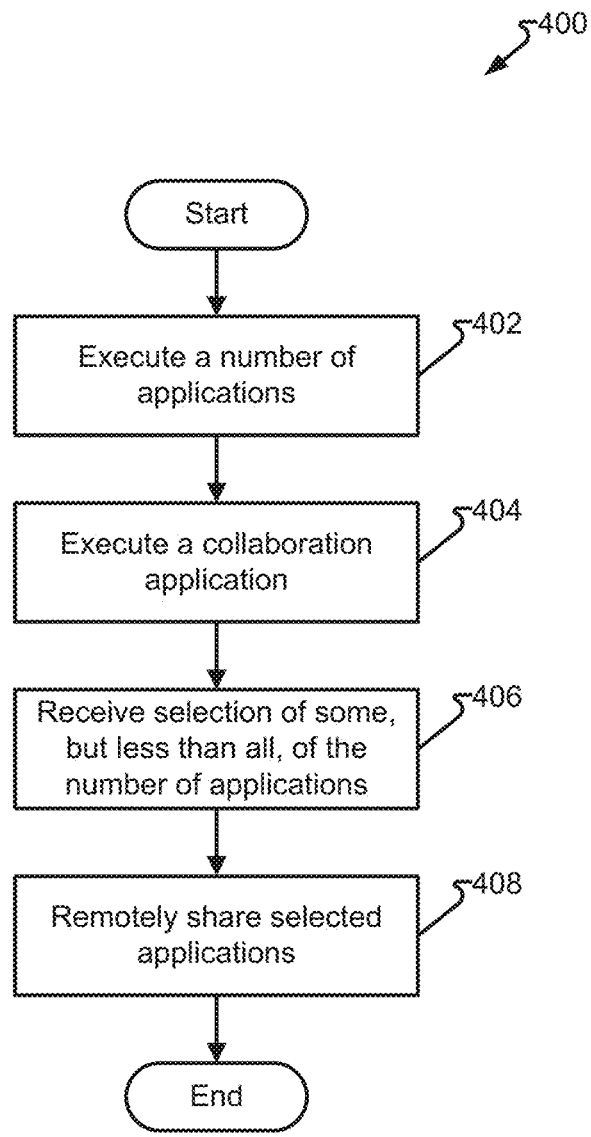
FIG. 4 depicts a first process in accordance with embodiments of the present disclosure.

FIG. 4 depicts process 400 in accordance with embodiments of the present disclosure. In one embodiment, process 400 is embodied as machine-readable instructions maintained in a non-transitory storage that, when read by a processor, cause the processor to execute the steps of process 400. In another embodiment, process 400 begins and step 402 executes a number of applications on a local computer, such as local computer 104. Step 404 executes a collaboration application on the local computer, such as to manage a connection with a remote computer, such as remote computer 112 and designate the applications having windows presented on the local computer that will and/or will not be shared with the remote computer for presentation thereon.

Next, step 406 receives the indication of the applications that present windows on the local computer that will be shared with the remote computer. Step 408 then shares the application comprising at least a plurality, but less than all, of applications executing on the local computer.

Figure 5:
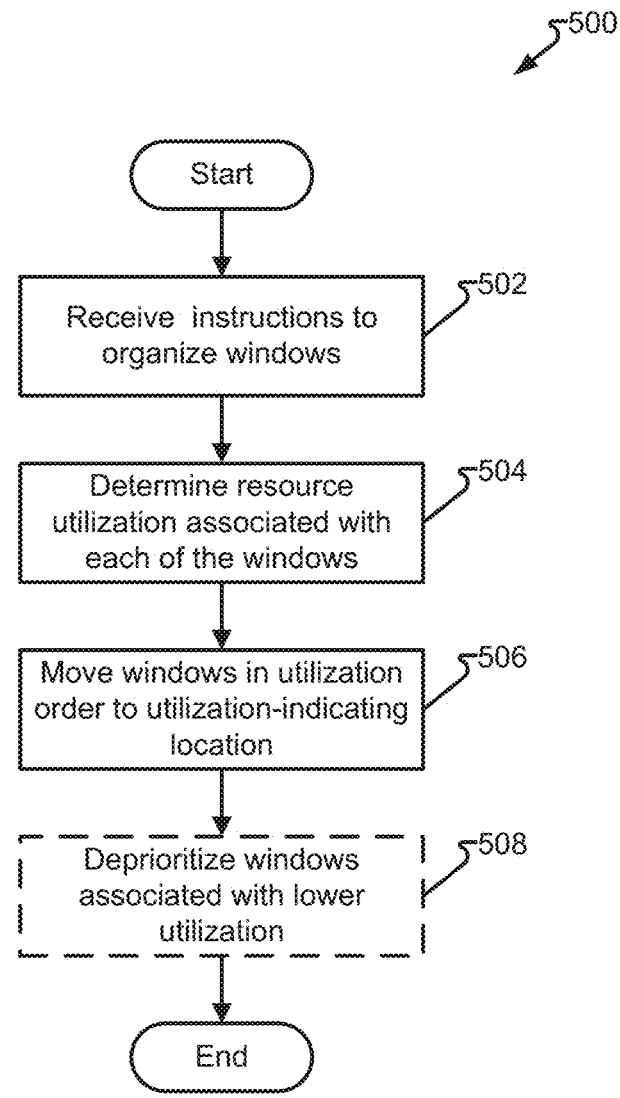
FIG. 5 depicts a second process in accordance with embodiments of the present disclosure.

FIG. 5 depicts process 500 in accordance with embodiments of the present disclosure. In one embodiment, process 500 is embodied as machine-readable instructions maintained in a non-transitory storage that, when read by a processor, cause the processor to execute the steps of process 500. Step 502 receives an instruction to organize windows due to resource utilization associated therewith, the instruction may be provided as an input to local computer 104 by local input device 108. Step 504 then determines the resource utilization associated with each of the windows, and step 506 then moves the windows to be in a resource-utilization order with either the highest or lowest utilizing resource being located in a previously determined location, such as the upper right corner of a grid or listing. Optionally, step 508 may deprioritize windows associated with a lower utilization.

In one embodiment, window utilization comprises the bandwidth utilized by the window during sharing. For example, an animation or movie may require a high amount of bandwidth, whereas a document may be relatively static and utilize a low amount of bandwidth. Additionally or alternatively, the resource may be memory, data storage, and/or processor cycles utilized by the underlying application associated with the window. As a further option, resource utilization as the degree of human input-output interaction from devices, such as keyboard, mouse, etc., may be utilized. And, as yet another embodiment, resources that have resource utilization that is above or below a previously designated threshold may have their respective indicia moved to a non-sharing location and the sharing for the application automatically terminated. For example, a collaboration session may have two applications shared, but only one application is presently being utilized and the under-utilized application may be removed from sharing to further preserve resources.

Figure 6:
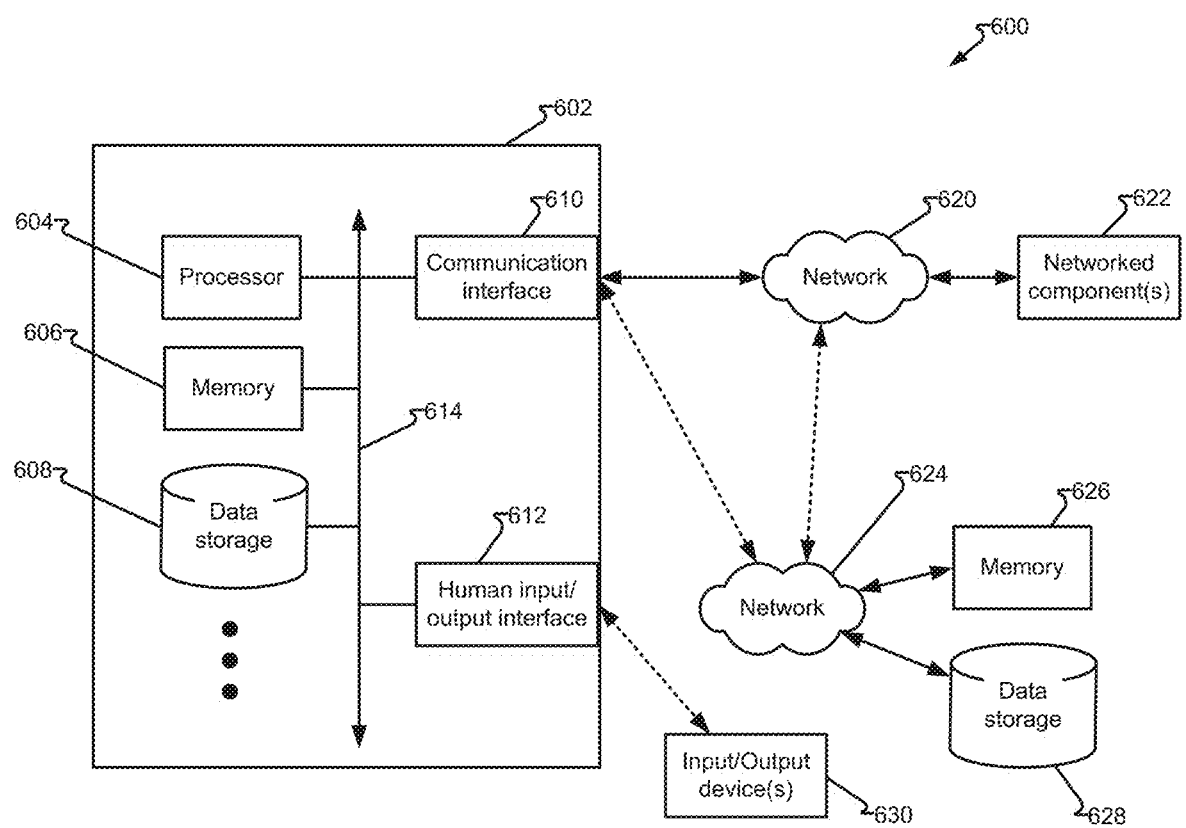
FIG. 6 depicts a third system in accordance with embodiments of the present disclosure.

FIG. 6 depicts device 602 in system 600 in accordance with embodiments of the present disclosure. In one embodiment, local computer 104 may be embodied, in whole or in part, as device 602 comprising various components and connections to other components and/or systems. The components are variously embodied and may comprise processor 604. The term "processor," as used herein, refers exclusively to electronic hardware components comprising electrical circuitry with connections (e.g., pin-outs) to convey encoded electrical signals to and from the electrical circuitry. Processor 604 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 614, executes instructions, and outputs data, again such as via bus 614. In other embodiments, processor 604 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 604 is a non-transitory computing device (e.g., electronic machine comprising circuitry and connections to communicate with other components and devices). Processor 604 may operate a virtual processor, such as to process machine instructions not native to the processor (e.g., translate the VAX operating system and VAX machine instruction code set into Intel® 9xx chipset code to allow VAX-specific applications to execute on a virtual VAX processor), however, as those of ordinary skill understand, such virtual processors are applications executed by hardware, more specifically, the underlying electrical circuitry and other hardware of the processor (e.g., processor 604). Processor 604 may be executed by virtual processors, such as when applications (i.e., Pod) are orchestrated by Kubernetes. Virtual processors allow an application to be presented with what appears to be a static and/or dedicated processor executing the instructions of the application, while underlying non-virtual processor(s) are executing the instructions and may be dynamic and/or split among a number of processors.

In addition to the components of processor 604, device 602 may utilize memory 606 and/or data storage 608 for the storage of accessible data, such as instructions, values, etc. Communication interface 610 facilitates communication with components, such as processor 604 via bus 614 with components not accessible via bus 614. Communication interface 610 may be embodied as a network port, card, cable, or other configured hardware device. Additionally or alternatively, human input/output interface 612 connects to one or more interface components to receive and/or present information (e.g., instructions, data, values, etc.) to and/or from a human and/or electronic device. Examples of input/output devices 630 that may be connected to input/output interface include, but are not limited to, keyboard, mouse, trackball, printers, displays, sensor, switch, relay, speaker, microphone, still and/or video camera, etc. In another embodiment, communication interface 610 may comprise, or be comprised by, human input/output interface 612. Communication interface 610 may be configured to communicate directly with a networked component or utilize one or more networks, such as network 620 and/or network 624.

Network 110 may be embodied, in whole or in part, as network 620. Network 620 may be a wired network (e.g., Ethernet), wireless (e.g., WiFi, Bluetooth, cellular, etc.) network, or combination thereof and enable device 602 to communicate with network component(s) 622. In other embodiments, network 620 may be embodied, in whole or in part, as a telephony network (e.g., public switched telephone network (PSTN), private branch exchange (PBX), cellular telephony network, etc.)

Additionally or alternatively, one or more other networks may be utilized. For example, network 624 may represent a second network, which may facilitate communication with components utilized by device 602. For example, network 624 may be an internal network to a business entity or other organization, whereby components are trusted (or at least more so) that networked components 622, which may be connected to network 620 comprising a public network (e.g., Internet) that may not be as trusted.

Components attached to network 624 may include memory 626, data storage 628, input/output device(s) 630, and/or other components that may be accessible to processor 604. For example, memory 626 and/or data storage 628 may supplement or supplant memory 606 and/or data storage 608 entirely or for a particular task or purpose. For example, memory 626 and/or data storage 628 may be an external data repository (e.g., server farm, array, "cloud," etc.) and allow device 602, and/or other devices, to access data thereon. Similarly, input/output device(s) 630 may be accessed by processor 604 via human input/output interface 612 and/or via communication interface 610 either directly, via network 624, via network 620 alone (not shown), or via networks 624 and 620. Each of memory 606, data storage 608, memory 626, data storage 628 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 630 may be a router, switch, port, or other communication component such that a particular output of processor 604 enables (or disables) input/output device 630, which may be associated with network 620 and/or network 624, to allow (or disallow) communications between two or more nodes on network 620 and/or network 624. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARIVI926EJS™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
a processor configured with machine-readable instructions maintained in a non-transitory memory;
a network interface to a network;
a local display;
an input device; and
wherein the processor:
executes a first application, a second application, and a third application;
causes the local display to present an output of each of a first window of the first application, a second window of the second application, and a third window of the third application;
executes a collaboration application to maintain a connection to a remote computer via the network wherein the connection comprises encoded signals comprising content presented on selected portions of the local display;

receives, via the input device, a user selection to organize windows comprising the first window and second window based on a specific criteria, the specific criteria comprising an amount of user of each of the first window and second window;

determines an amount of resource utilization for each of the first application and the second application; and automatically moves a most utilized window of the first window or second window, associated with the first application or the second application having a greatest resource utilization, to a location closest to a portion of the local display associated with greater resource utilization; and wherein the encoded signals comprise the first window and the second window and not the third window.

2. The system of claim 1, wherein the third application comprises an operating system of a local computer and wherein the third window comprises a desktop application.

3. The system of claim 1, wherein:
the processor further executes a fourth application; and
wherein the processor further causes the local display to present a fourth window of the fourth application; and
wherein the encoded signals further comprise the fourth window.

4. The system of claim 1, wherein the amount of resource utilization of the first application and the second application, comprises a bandwidth utilization of the first window and the second window, respectively.

5. The system of claim 1, wherein the processor further:
causes a graphical user interface (GUI) to be presented on the local display, wherein a portion of the GUI comprises a placement configuration portion comprising a number of positions;
places indicia of the first window in a first of the number of positions, indicia of the second window in a second of the number of positions, indicia of the third window in a third of the number of positions; and
receives a user selection via an input device to select ones of the first window, the second window, and the third window for either inclusion or exclusion within the encoded signals.

6. The system of claim 5, wherein the placement configuration portion comprises a grid forming a number of squares and wherein the number of positions further comprise the number of squares.

7. The system of claim 1, wherein the encoded signals, when decoded by the remote computer cause a remote first window and remote second window to be presented on a remote display.

8. The system of claim 7, wherein the remote first window and remote second window are presented within a collaboration window of a remote collaboration application executed by a processor of the remote computer.

9. The system of claim 7, wherein the remote first window and remote second window are presented as discrete and independently placed windows of a remote collaboration application executed by a processor of the remote computer.

10. A method, comprising:
executing, by a processor of a local computer, a first application, a second application, and a third application;
causing a local display of the local computer to present an output of each of a first window of the first application, a second window of the second application, and a third window of the third application;

executing a collaboration application that maintains a connection to a remote computer via a network and wherein the connection comprises encoded signals of content presented on selected portions of the local display;

receiving, via an input device to the local computer, a user selection to organize windows comprising the first window and second window based on a specific criteria, the specific criteria comprising an amount of user of each of the first window and second window;

determining, by the processor, an amount of resource utilization for each of the first application and the second application; and automatically moving, by the processor, a most utilized window of the first window or second window, associated with the first application or the second application having a greatest resource utilization, to a location closest to a portion of the local display associated with greater resource utilization; and wherein the encoded signals comprise the first window and the second window and not the third window.

11. The method of claim 10, wherein the third application comprises an operating system of the local computer and wherein the third window comprises a desktop application.

12. The method of claim 10, further comprising:
executing, by the processor, a fourth application; and
wherein the processor further causes the local display to present a fourth window of the fourth application; and
wherein the encoded signals further comprise the fourth window.

13. The method of claim 10, wherein the amount of resource utilization of the first application and the second application, comprises a bandwidth utilization of the first window and the second window, respectively.

14. The method of claim 10, further comprising:
presenting, by the processor, a graphical user interface (GUI) on the local display, wherein a portion of the GUI comprises a placement configuration portion comprising a number of positions;
placing, by the processor, indicia of the first window in a first of the number of positions, indicia of the second window in a second of the number of positions, indicia of the third window in a third of the number of positions; and
receiving, by the processor, a user selection via an input device to select ones of the first window, the second window, and the third window for either inclusion or exclusion within the encoded signals.

15. The method of claim 14, wherein the placement configuration portion comprises a grid forming a number of squares and wherein the number of positions further comprise the number of squares.

16. The method of claim 10, wherein the encoded signals, when decoded by the remote computer cause a remote first window and remote second window to be presented on a remote display.

17. A system, comprising:
means to execute a first application, a second application, and a third application on a local computer;
means to present on a local display of the local computer each of a first window of the first application, a second window of the second application, and a third window of the third application;
means to execute on the local computer a collaboration application that maintains a connection to a remote computer via a network and wherein the connection comprises encoded signals of content presented on selected portions of the local display;

means to receive, via an input device, a user selection to organize windows comprising the first window and second window based on a specific criteria, the specific criteria comprising an amount of use of each of the first window and second window;

means to determine an amount of resource utilization for each of the first application and the second application; and means to automatically move a most utilized window of the first window or second window, associated with the first application or the second application having a greatest resource utilization, to a location closest to a portion of the local display associated with greater resource utilization; and wherein the encoded signals comprise the first window and the second window and not the third window.

18. The system of claim 17, wherein the third application comprises an operating system of the local computer and wherein the third window comprises a desktop application.

19. The system of claim 17, wherein the amount of resource utilization of the first application and the second application, comprises a bandwidth utilization of the first window and the second window, respectively.

20. The system of claim 17, further comprising:

means to cause a graphical user interface (GUI) to be presented on the local display, wherein a portion of the GUI comprises a placement configuration portion comprising a number of positions;

means to place indicia of the first window in a first of the number of positions, indicia of the second window in a second of the number of positions, indicia of the third window in a third of the number of positions; and means to receive a user selection via an input device to select ones of the first window, the second window, and the third window for either inclusion or exclusion within the encoded signals.

* * * * *